(12) United States Patent
Erickson

(10) Patent No.: US 11,453,616 B2
(45) Date of Patent: *Sep. 27, 2022

(54) ELONGATE SHAPED ABRASIVE PARTICLES, METHODS OF MAKING THE SAME, AND ABRASIVE ARTICLE INCLUDING THE SAME

(71) Applicant: 3M INNOVATIVE PROPERTIES COMPANY, St. Paul, MN (US)

(72) Inventor: Dwight D. Erickson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 807 days.

This patent is subject to a terminal disclaimer.

(21) Appl. No.: 16/087,013

(22) PCT Filed: Mar. 23, 2017

(86) PCT No.: PCT/US2017/023726
§ 371 (c)(1),
(2) Date: Sep. 20, 2018

(87) PCT Pub. No.: WO2017/172470
PCT Pub. Date: Oct. 5, 2017

(65) Prior Publication Data
US 2019/0106362 A1    Apr. 11, 2019

Related U.S. Application Data

(60) Provisional application No. 62/316,854, filed on Apr. 1, 2016.

(51) Int. Cl.
*B24D 3/14*    (2006.01)
*B24D 3/20*    (2006.01)
(Continued)

(52) U.S. Cl.
CPC .............. *C04B 35/624* (2013.01); *B24D 3/14* (2013.01); *B24D 3/20* (2013.01); *B24D 5/02* (2013.01);
(Continued)

(58) Field of Classification Search
CPC .... B24D 3/14; B24D 3/20; B24D 5/02; C04B 35/1115
See application file for complete search history.

(56) References Cited

U.S. PATENT DOCUMENTS 2,127,504 A    8/1938    Derr
3,340,205 A    9/1967    Hayes
(Continued)

FOREIGN PATENT DOCUMENTS

CN    1294543 A    5/2001
CN    201872021 U    6/2011
(Continued)

OTHER PUBLICATIONS

Erickson, co-pending U.S. Appl. No. 17/335,513, filed Jun. 1, 2021.
(Continued)

*Primary Examiner* — Pegah Parvini
(74) *Attorney, Agent, or Firm* — Bradford B. Wright

(57) ABSTRACT

An elongate shaped abrasive particle comprises an elongate shaped ceramic body having opposed first and second ends joined to each other by at least two longitudinal sidewalls. At least one of the at least two longitudinal sidewalls is concave along its length. At least one of the first and second ends is a fractured surface. Methods of making elongate shaped abrasive particles and abrasive articles including them are also disclosed.

6 Claims, 5 Drawing Sheets

(51) Int. Cl.
  *B24D 18/00* (2006.01)
  *C09K 3/14* (2006.01)
  *B24D 5/02* (2006.01)
  *C04B 35/624* (2006.01)
  *C04B 35/111* (2006.01)
  *B28B 1/14* (2006.01)
  *B28B 17/00* (2006.01)
  *B28B 7/24* (2006.01)

(52) U.S. Cl.
  CPC ............ *B24D 18/0009* (2013.01); *B28B 1/14* (2013.01); *B28B 7/24* (2013.01); *B28B 17/0018* (2013.01); *C04B 35/111* (2013.01); *C04B 35/1115* (2013.01); *C09K 3/1427* (2013.01); *C04B 2235/322* (2013.01); *C04B 2235/3206* (2013.01); *C04B 2235/3217* (2013.01); *C04B 2235/3224* (2013.01); *C04B 2235/3225* (2013.01); *C04B 2235/3227* (2013.01); *C04B 2235/449* (2013.01); *C04B 2235/602* (2013.01); *C04B 2235/6023* (2013.01); *C04B 2235/6027* (2013.01); *C04B 2235/94* (2013.01); *C04B 2235/945* (2013.01)

(56) References Cited

U.S. PATENT DOCUMENTS

| | | |
|---|---|---|
| 3,957,598 A | 5/1976 | Merkl |
| 4,314,827 A | 2/1982 | Leitheiser |
| 4,543,107 A | 9/1985 | Rue |
| 4,588,419 A | 5/1986 | Caul |
| 4,623,364 A | 11/1986 | Cottringer |
| 4,741,743 A | 5/1988 | Narayanan |
| 4,744,802 A | 5/1988 | Schwabel |
| 4,751,138 A | 6/1988 | Tumey |
| 4,770,671 A | 9/1988 | Monroe |
| 4,800,685 A | 1/1989 | Haynes, Jr. |
| 4,848,041 A | 7/1989 | Kruschke |
| 4,881,951 A | 11/1989 | Wood |
| 4,898,597 A | 2/1990 | Hay |
| 4,997,461 A | 3/1991 | Markhoff-Matheny |
| 5,009,675 A | 4/1991 | Kunz |
| 5,009,676 A | 4/1991 | Rue |
| 5,011,508 A | 4/1991 | Wald |
| 5,035,723 A | 7/1991 | Kalinowski |
| 5,037,453 A | 8/1991 | Narayanan |
| 5,090,968 A | 2/1992 | Pellow |
| 5,094,672 A | 3/1992 | Giles, Jr. |
| 5,110,332 A | 5/1992 | Isaksson |
| 5,118,326 A | 6/1992 | Lee |
| 5,131,926 A | 7/1992 | Restoker |
| 5,152,917 A | 10/1992 | Pieper |
| 5,194,072 A | 3/1993 | Rue |
| 5,201,916 A | 4/1993 | Berg |
| 5,203,884 A | 4/1993 | Buchanan |
| 5,203,886 A | 4/1993 | Sheldon |
| 5,213,591 A | 5/1993 | Celikkaya |
| 5,227,104 A | 7/1993 | Bauer |
| 5,244,477 A | 9/1993 | Rue |
| 5,282,875 A | 2/1994 | Wood |
| 5,366,523 A | 11/1994 | Rowenhorst |
| 5,435,816 A | 7/1995 | Spurgeon |
| 5,436,063 A | 7/1995 | Follett |
| 5,498,269 A | 3/1996 | Larmie |
| 5,547,479 A | 8/1996 | Conwell |
| 5,551,963 A | 9/1996 | Larmie |
| 5,672,097 A | 9/1997 | Hoopman |
| 5,725,162 A | 3/1998 | Garg |
| 5,738,696 A | 4/1998 | Wu |
| 5,776,214 A | 7/1998 | Wood |
| 5,863,308 A | 1/1999 | Qi |
| 5,946,991 A | 9/1999 | Hoopman |
| 5,975,987 A | 11/1999 | Hoopman |
| 5,984,988 A | 11/1999 | Berg |
| 6,054,093 A | 4/2000 | Torre, Jr. |
| 6,129,540 A | 10/2000 | Hoopman |
| 8,142,531 B2 | 3/2012 | Adefris |
| 8,142,891 B2 | 3/2012 | Culler |
| 9,039,797 B2 | 5/2015 | Erickson |
| 2008/0070779 A1 | 3/2008 | Evans |
| 2010/0146867 A1 | 6/2010 | Boden |
| 2011/0314746 A1 | 12/2011 | Erickson |
| 2014/0017985 A1 | 1/2014 | Tian et al. |
| 2014/0109490 A1 | 4/2014 | Boden |
| 2014/0182217 A1 | 7/2014 | Yener |
| 2014/0325916 A1 | 11/2014 | Yener |
| 2015/0052825 A1 | 2/2015 | Adefris |
| 2015/0089881 A1* | 4/2015 | Stevenson ............ C09K 3/1409 51/309 |
| 2016/0068729 A1 | 3/2016 | Erickson |
| 2020/0231851 A1 | 7/2020 | Erickson |

FOREIGN PATENT DOCUMENTS

| | | |
|---|---|---|
| CN | 104582901 A | 4/2015 |
| GB | 1193258 | 5/1970 |
| WO | WO 94/02559 | 2/1994 |
| WO | WO 2012/061033 | 5/2012 |
| WO | WO 2013-151745 | 10/2013 |
| WO | WO 2014-165390 | 10/2014 |
| WO | WO 2015-164211 | 10/2015 |

OTHER PUBLICATIONS

Erickson, co-pending U.S. Appl. No. 17/335,439, filed Jun. 1, 2021.
International Search Report for PCT International Application No. PCT/US2017/023726, dated Jun. 29, 2017, 4 pages.

* cited by examiner

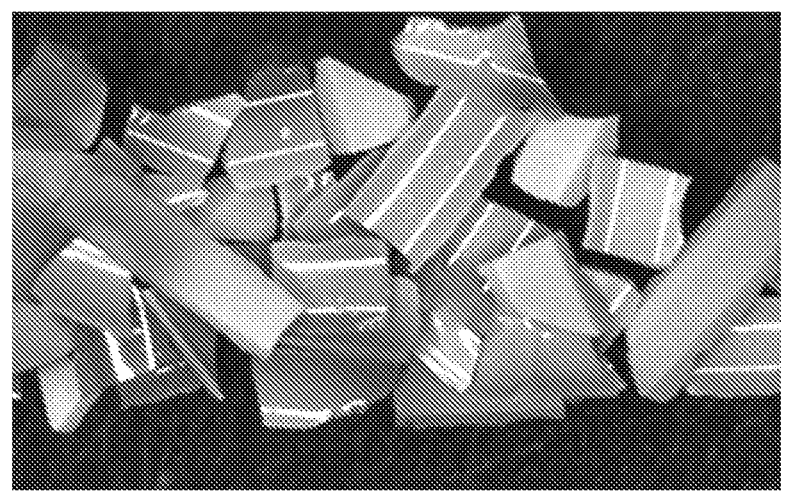
FIG. 5
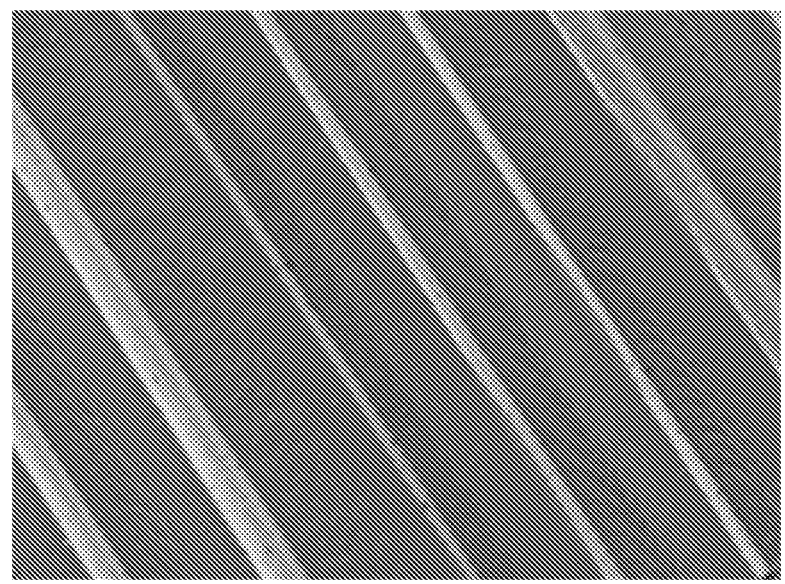
FIG. 6A    100μm

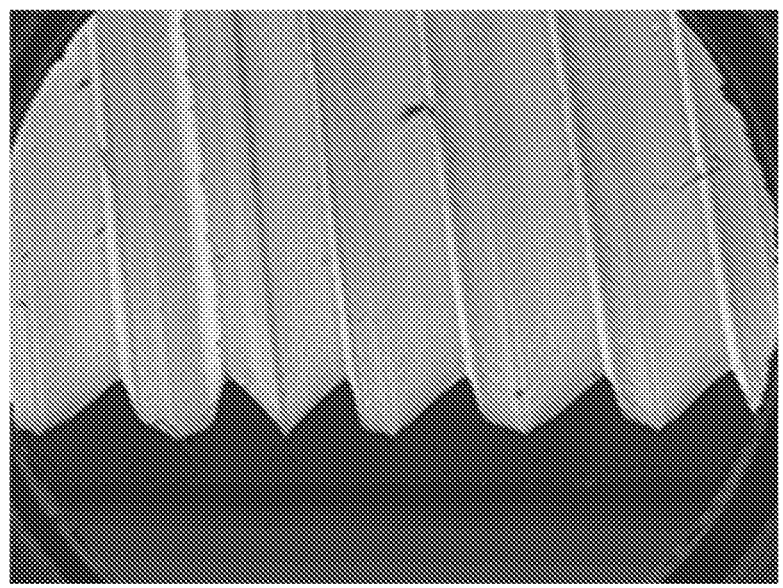
FIG. 6B  1mm
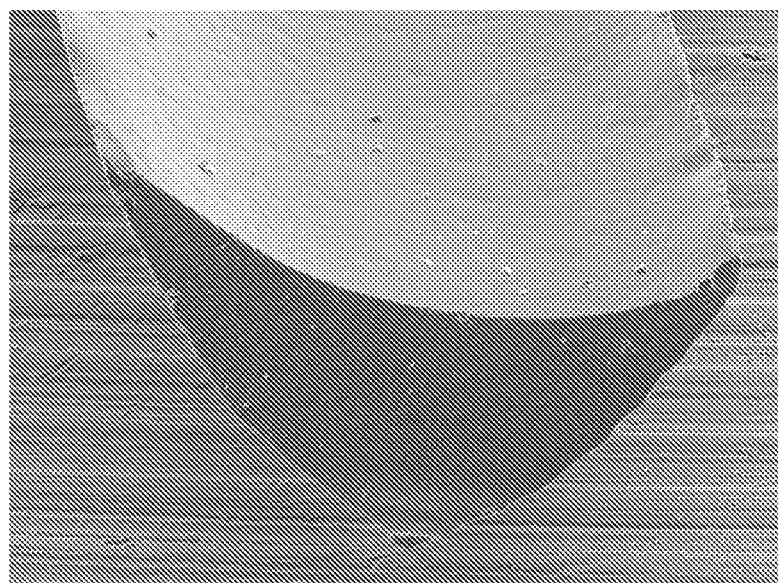
FIG. 7A  10μm

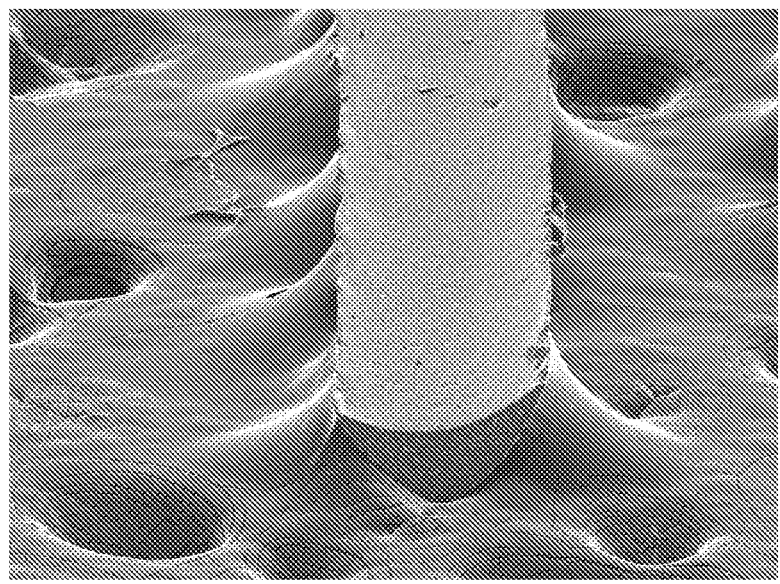
FIG. 7B   100μm

11,453,616 B2

ELONGATE SHAPED ABRASIVE PARTICLES, METHODS OF MAKING THE SAME, AND ABRASIVE ARTICLE INCLUDING THE SAME

TECHNICAL FIELD

The present disclosure broadly relates to elongate abrasive particles, methods of their manufacture, and their use in abrasive articles.

BACKGROUND

Elongate abrasive filaments are used in bonded abrasive articles. Precursor filaments (typically of a sol-gel ceramic precursor) are extruded and cut or broken to desired lengths, and then fired. The resultant abrasive filaments (sometimes termed "rods") are used in abrasive products such as bonded abrasive wheels, for example. However, in such processes it is difficult or impossible to precisely control the shape of the abrasive filaments; for example, due to curling of the filaments during the extrusion process. There is a need for new methods of making elongate abrasive particles. Further, there is a continuing need for new abrasive particle shapes that can provide improved abrading performance, especially in bonded abrasive articles.

SUMMARY

Above-identified needs in the art are provided according to the present disclosure. Advantageously, abrasive particles having elongate ceramic bodies according to the present disclosure have a concave side that extends longitudinally along the surface of the particles, which creates sharp ridges which may enhance abrasive performance. Further, the method can be practiced using inexpensive off-the-shelf molds.

In one aspect, the present disclosure provides an elongate shaped abrasive particle comprising an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface.

In another aspect, the present disclosure provides a plurality of elongate shaped abrasive particles, wherein at least half of the plurality of elongate shaped abrasive particles comprises elongate shaped abrasive particles according to the present disclosure. The present disclosure also provides a bonded abrasive article comprising the plurality of elongate shaped abrasive particles bonded together by a binder material.

In yet another aspect, the present disclosure provides a method of making a plurality of elongate shaped abrasive particles, the method comprising sequential steps:

a) providing a mold having a plurality of isolated open-ended grooves disposed on a major surface thereof;

b) filling at least a portion of the plurality of isolated open-ended grooves with a molding composition comprising a ceramic precursor material and a volatile liquid;

c) removing any excess molding composition not disposed within the plurality of isolated open-ended grooves, if present, from the mold;

d) removing a sufficient amount of the liquid vehicle to provide a plurality of dimensionally stable elongate precursor bodies; and e) converting at least a portion of the plurality of dimensionally stable elongate precursor bodies into the elongate shaped abrasive particles, each comprising, respectively, an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface.

As used herein:

the term "aspect ratio" refers to the ratio of average length to average thickness;

the adjectives "elongate" and "elongated" mean having an aspect ratio of at least 2;

the term "fractured surface" refers to a surface formed by a fracturing process;

the term "isolated" used in reference to parallel open-ended grooves, means that the parallel open-ended grooves are not interconnected by intersecting grooves (e.g., a lattice pattern);

the term "length" refers to the longest dimension of an object;

the term "width" refers to the longest dimension of an object that is perpendicular to its length;

the term "thickness" refers to the longest dimension of an object that is perpendicular to both of its length and width; and the term "shaped ceramic body" refers to a ceramic body having a shape at least partially determined by a mold (e.g., an open face mold) used in its manufacture (e.g., it is determined by the shape of a corresponding mold cavity used in its manufacture).

Features and advantages of the present disclosure will be further understood upon consideration of the detailed description as well as the appended claims.

BRIEF DESCRIPTION OF THE DRAWINGS

FIG. 5 is an optical micrograph of elongate shaped abrasive particles produced in Example 1.

FIGS. 6A and 6B are SEM micrographs of the tool used to prepare the elongate shaped abrasive particles of Example 2.

FIGS. 7A and 7B are SEM micrographs of elongate shaped abrasive particles prepared in Example 2.

Figure 1A:
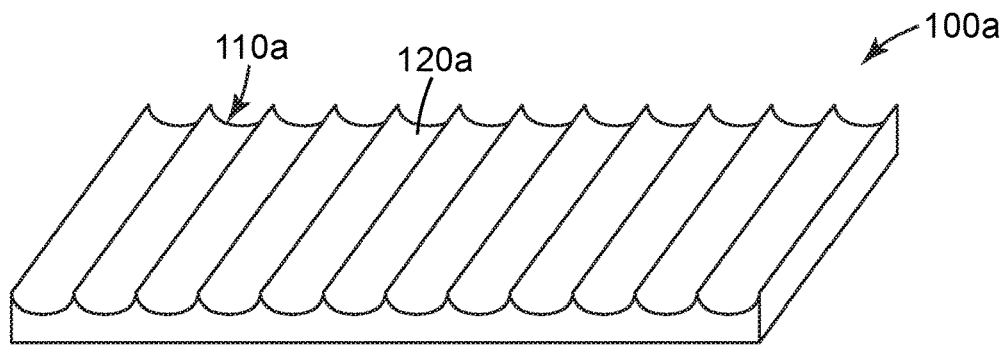
FIGS. 1A-1D are schematic perspective views of respective molds 100a-100d.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Methods according to the present disclosure method for making elongate abrasive particles may include a number of steps carried out sequentially. It is not necessary that any of the steps be carried out consecutively, although in some embodiments it may be preferred to carry out at least some (or even all) of the sequential steps consecutively.

In the first step a mold is provided. The mold has a plurality of isolated open-ended grooves disposed on a major surface thereof. The grooves may be linear, curved, or a mixture of linear and grooved portions. Individual grooves may be different in shape (when viewed normal to the mold surface), width, length, cross-sectional profile, and/or depth. In some preferred embodiments, all of the grooves are identical. In some preferred embodiments, the grooves are linear and parallel. In some preferred embodiments, the grooves are identical, linear, and parallel. In general, the grooves are open at the surface of the mold, and the ends of grooves extend across the mold surface to the sides, where they are open at their ends. Preferably, the isolated grooves have constant cross-sectional shape and area along their lengths, although this is not a requirement.

In order to form elongate ceramic bodies, the grooves themselves should have an aspect ratio of at least 2, preferably, at least 5, at least 10, at least 15, at least 20, at least 30, at least 40, at least 50, or even more.

Figure 1B:
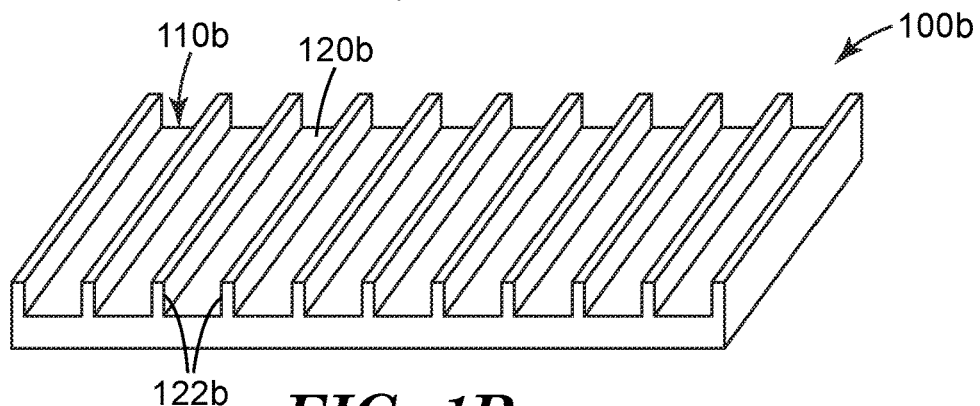
Figure 1C:
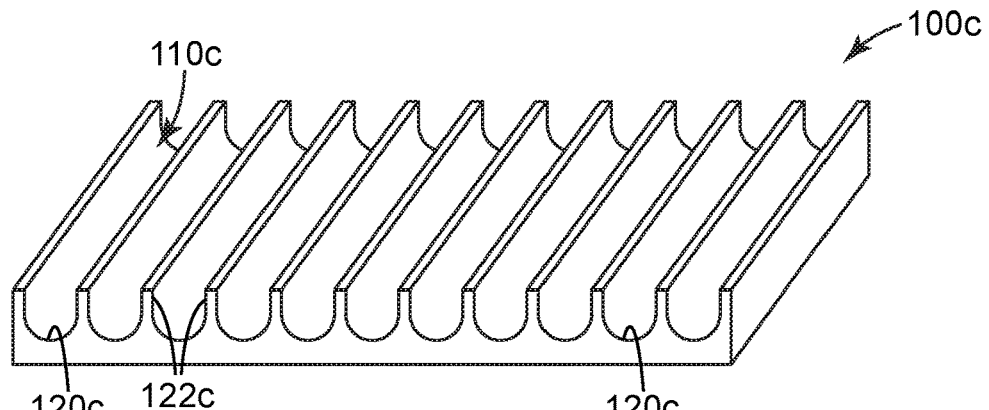
Figure 1D:
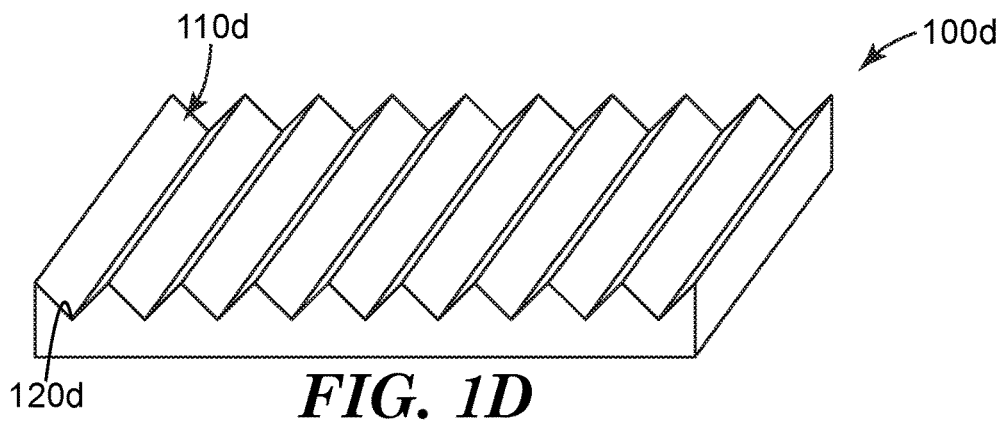

FIGS. 1A-1D illustrate various possible mold 100a-100d configurations of grooves 110a-110d. For example, in FIG. 1A, mold 100a has linear parallel isolated grooves 110a with rounded bottoms 120a with a semicircular transverse cross-sectional shape. In FIG. 1B, mold 100b has linear parallel isolated grooves 110b with two parallel vertical sidewalls 122b contacting a flat bottom 120b. In FIG. 1C, mold 100c has linear parallel isolated grooves 110c with two parallel vertical sidewalls 122c contacting a rounded bottom 120c. In FIG. 1D, mold 100d has isolated grooves 110d with a v-shaped bottom 120d.

In a second step, at least a portion of the plurality of isolated open-ended grooves are filled with a molding composition comprising a ceramic precursor material and a volatile liquid.

Exemplary ceramic precursor materials include: transitional aluminas (e.g., boehmite, diaspore, gibbsite, bayerite, nordstrandite); aluminum salts and complexes such as, for example, basic aluminum carboxylates (e.g., basic aluminum carboxylates of the general formula Al(OH)y(carboxylate)3-y, where y is between 1 and 2, preferably between 1 and 1.5, and the carboxylate counterion is selected from the group consisting of formate, acetate, propionate, and oxalate, or combinations of these carboxylates, aluminum formoacetate, and aluminum nitroformoacetate); basic aluminum nitrates; partially hydrolyzed aluminum alkoxides; and combinations thereof. Basic aluminum carboxylates can be prepared by digesting aluminum metal in a solution of the carboxylic acid as described in U.S. Pat. No. 3,957,598 (Merkl). Basic aluminum nitrates can also be prepared by digesting aluminum metal in a nitric acid solution as described in U.S. Pat. No. 3,340,205 (Hayes et al.) or British Pat. No. 1,193,258 (Fletcher et al.), or by the thermal decomposition of aluminum nitrate as described in U.S. Pat. No. 2,127,504 (Den et al.). These materials can also be prepared by partially neutralizing an aluminum salt with a base. The basic aluminum nitrates have the general formula $Al(OH)_z(NO_3)_{3-z}$, where z is from about 0.5 to 2.5.

Suitable boehmites include, for example, those commercially available under the trade designation "HIQ" (e.g., HIQ-9015) from BASF Corp., Florham Park, N.J., and those commercially available under the trade designations "DISPERAL", "DISPAL", and "CATAPAL D" from Sasol North America, Houston, Tex. In some embodiments, the ceramic precursor may comprise, alone or in addition, fine alpha alumina particles that upon sintering fuse together to form a sintered alpha alumina ceramic body, e.g., as disclosed in U.S. Publ. Pat. Appln. No. 2016/0068729 A1 (Erickson et al.).

The ceramic precursor material should comprise a sufficient amount of the liquid vehicle for the viscosity of the composition to be sufficiently low to enable filling the mold cavities, but not so much liquid as to cause subsequent removal of the liquid from the mold cavities to be prohibitively expensive. In some preferred embodiments, the ceramic precursor material comprises an alpha alumina precursor.

Further details regarding alpha alumina precursor, including methods for making them and converting them into abrasive particles, can be found, for example, in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Gang et al.); U.S. Pat. No. 5,776,214 (Wood); U.S. Pat. No. 8,142,531 (Adefris et al.); and U.S. Pat. No. 8,142,891 (Culler et al.).

In one exemplary embodiment, the ceramic precursor material comprises a sol-gel composition comprises from 2 to 90 weight percent of an alpha alumina precursor material (e.g., aluminum oxide monohydrate (boehmite)), and at least 10 weight percent, from 50 to 70 weight percent, or 50 to 60 weight percent, of volatile components such as water. In some embodiments, the sol-gel composition contains from 30 to 50 weight percent, or 40 to 50 weight percent of the alpha alumina precursor material. As used herein, the term "sol-gel composition" refers to a colloidal dispersion of solid particles in a liquid that forms a three-dimensional network of the solid particles on heating over a period of time, or removal of some of the liquid. In some cases, gel formation may be induced by addition of polyvalent metal ions.

A peptizing agent can be added to the sol-gel composition to produce a more stable hydrosol or colloidal sol-gel composition. Suitable peptizing agents are monoprotic acids or acid compounds such as acetic acid, hydrochloric acid, formic acid, and nitric acid. Multiprotic acids can also be used but they can rapidly gel the sol-gel composition, making it difficult to handle or to introduce additional components thereto. Some commercial sources of boehmite contain an acid titer (such as absorbed formic or nitric acid) that will assist in forming a stable sol-gel composition.

Seed particles and/or crystal grain size modifiers may optionally be added to the sol-gel composition, but advantageously they are typically not needed in order to achieve small alpha alumina crystal grain sizes.

Examples of optional alumina grain size modifiers include $Li_2O$, $Na_2O$, $MgO$, $SiO_2$, $CaO$, $SrO$, $TiO_2$, $MnO$, $Cr_2O_3$, $Fe_2O_3$, $CoO$, $NiO$, $ZnO$, $ZrO_2$, $SnO_2$, $HfO_2$, rare earth oxides (e.g., $La_2O_3$, $CeO_2$, $Pr_2O_3$, $Nd_2O_3$, $Sm_2O_3$, $Eu_2O_3$, $Gd_2O_3$, $Dy_2O_3$, $Er_2O_3$, $Yb_2O_3$, $TbO_2$, $Y_2O_3$), combinations thereof, and precursors thereof. In some embodiments, the ceramic precursor material, and hence the corresponding ceramic abrasive particles, are essentially free of any or all of the foregoing and/or other alumina grain size modifiers.

The alpha alumina precursor may be "seeded" with a material having the same crystal structure as, and lattice parameters as close as possible to, those of alpha alumina.

The "seed" particles are added in as finely divided form as possible, and are dispersed uniformly throughout the sol or gel. Seed particles can be added ab initio or it can be formed in situ. The function of seed particles is to cause the transformation to the alpha form to occur uniformly throughout the alpha alumina precursor at a much lower temperature than is needed in the absence of the seed. Suitable seeds include alpha alumina itself and also other compounds such as alpha ferric oxide, chromium suboxide, nickel titanate and a plurality of other compounds that have lattice parameters sufficiently similar to those of alpha alumina to be effective to cause the generation of alpha alumina from a precursor at a temperature below that at which the conversion normally occurs in the absence of such seed. Examples of suitable seed particles include particles of $Ti_2O_3$, $MgO.TiO_2$, $FeO.TiO_2$, $NiO.TiO_2$, $CoO.TiO_2$, $MnO.TiO_2$, $ZnO.TiO_2$, $V_2O_3$, $Ga_2O_3$, $Rh_2O_3$, alpha-$Al_2O_3$, alpha-$Cr_2O_3$, and alpha-$Fe_2O_3$ particles, preferably having an average particle size of from about 10 nm to about 120 nanometers, although other sizes may be used. In some embodiments, the precursor particles, and likewise the derived ceramic abrasive particles, are essentially free of seed particles such as, for example, alpha-Al2O3 seed particles, alpha-$Cr_2O_3$ seed particles, or alpha-$Fe_2O_3$ seed particles.

Sol-gel compositions can be formed by any suitable means, such as, for example, simply by mixing aluminum oxide monohydrate with water containing a peptizing agent or by forming an aluminum oxide monohydrate slurry to which the peptizing agent is added. Defoamers and/or other suitable chemicals can be added to reduce the tendency to form bubbles or entrain air while mixing. Additional chemicals such as wetting agents, alcohols, and/or coupling agents can be added if desired.

The molding composition may have any suitable form and/or composition, but preferably comprises a sol-gel composition (i.e., a dispersion of colloidal ceramic precursor particles), a slurry, or a viscous solution.

Exemplary volatile liquids include, water, alcohols, ethers, ketones, and ester alcohols. Preferably, the volatile liquid comprises at least 5 percent, at least 20 percent, at least 40 percent, at least 60 percent, at least 80 percent, or even 100 percent by weight of water.

The molding composition may be introduced into the grooves by any desired means. Flood coating, roll coating, or curtain coating may be used to introduce the molding composition into the grooves, for example. In general, the viscosity of the molding composition should be sufficiently high that excessive loss of material from the grooves does not occur before removal of the volatile liquid.

The grooves may be at least partially (preferably completely) filled with the molding composition by any suitable technique. In some embodiments, a knife roll coater or vacuum slot die coater can be used. A mold release compound can be used to aid in removing the particles from the mold if desired. Typical mold release agents include, for example, oils such as peanut oil or mineral oil, fish oil, silicones, polytetrafluoroethylene, zinc stearate, and graphite.

In one embodiment, the top surface of the mold is coated with the molding composition. The molding composition can be pumped onto top surface. Next, a scraper or leveler bar is used to urge the molding composition fully into the grooves of the mold.

After introducing the molding composition into the grooves, excess molding composition remaining on the mold surface, if present, can be removed by a doctor blade or squeegee.

Next, at least some of the volatile liquid is removed; for example, by evaporation using heat, infrared radiation, and/or forced air. A sufficient amount of the volatile liquid should be removed such that the molding composition in the grooves forms dimensionally stable elongate precursor bodies if removed from the mold. During this process, the exposed longitudinal surface of the molding composition depresses toward its center thereby forming a rounded channel that is concave along its length. Desirably, the volatile components are removed at a fast evaporation rates. In some embodiments, removal of the volatile component by evaporation occurs at temperatures above the boiling point of the volatile component. The upper limit to the drying temperature often depends on the material the mold is made from. The amount of the volatile liquid removed will typically vary depending on the composition of the molding liquid. For example, at least 10 percent, at least 30 percent, at least 50 percent, at least 70 percent, at least 90 percent, or even at least 99 percent by weight of the volatile liquid composition is removed.

Next, at least a portion of the dimensionally stable elongate precursor bodies produced above are converted into the elongate shaped abrasive particles, each comprising, respectively, an elongate shaped ceramic body having opposed first and second ends joined to each other by at least two longitudinal sidewalls. At least one of longitudinal sidewalls is concave along its length. At least one of the first and second ends is a fractured surface (e.g., one end or both ends). In general, all ends except those corresponding to the open ends of the grooves (which will be not be molded) will be fractured. Depending on the lengths of the grooves and the resultant elongate shaped ceramic bodies, the fraction of elongate shaped abrasive particles produced having two fractured ends may varying. In preferred embodiments, the fraction of elongate shaped ceramic bodies having two fractured ends may be at least 50 percent by weight, 60 percent by weight, 70 percent by weight, 80 percent by weight, 90 percent by weight, 95 percent by weight, or even 99 percent by weight. If elongate shaped ceramic bodies corresponding to those formed at the ends of the grooves are removed, then all of the elongate shaped ceramic bodies may have two fractured ends, for example. In some cases it may be possible to fracture at least partially dried molding material extending beyond the ends of grooves (e.g., if the mold rests on a platen that extends beyond the ends of the grooves), in which case, all of the elongate shaped ceramic bodies may also have two fractured ends.

Elongate shaped abrasive particles made according to the present disclosure can be incorporated into an abrasive article, or used in loose form. Elongate shaped abrasive particles are generally graded to a given particle size distribution before use. Such distributions typically have a range of particle sizes, from coarse particles to fine particles. In the abrasive art this range is sometimes referred to as a "coarse", "control", and "fine" fractions. Elongate shaped abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

Due to the ratio of the length to the width of some elongate shaped abrasive particles, it may be preferred to size the particles based on the average particle width ("$W_{avg}$"), the average particle length ("$L_{avg}$"), and/or the ratio $L_{avg}/W_{avg}$. For example, they may have values of: $W_{avg}=1110\pm55$ microns and $L_{avg}/W_{avg}=1.5$ to 3.5; $W_{avg}=890\pm45$ microns and $L_{avg}/W_{avg}=1.5$ to 3.5; $W_{avg}=510\pm26$ microns and $L_{avg}/W_{avg}=2.9$ to 4.5; $W_{avg}=340\pm17$ microns and $L_{avg}/W_{avg}=3.1$ to 4.9; $W_{avg}=240\pm12$ microns and $L_{avg}/W_{avg}=3.3$ to 5.1; $W_{avg}=240\pm12$ microns and $L_{avg}/W_{avg}=3.3$ to 5.1; $W_{avg}=194\pm7$ microns and $L_{avg}/W_{avg}=3.3$ to 5.1; $W_{avg}=146\pm6$ microns and $L_{avg}/W_{avg}=3.3$ to 5.1; $W_{avg}=132\pm5$ microns and $L_{avg}/W_{avg}=3.3$ to 5.1.

The width of the elongate shaped abrasive particles may be of any desired dimension. For example, in some embodiments, the width may be at least 100 microns, at least 150 microns, at least 200 microns, at least 250 microns, at least 500 microns, at least 1000 microns. Likewise, in some embodiments, the width may be, for example, less than 2500 microns, less than 1500 microns, less than 1000 microns, less than 500 microns, less than 400 microns, less than 300 microns, or less than 200 microns.

Elongate shaped abrasive particles according to the present disclosure can be used in combination with other abrasive particles (e.g., crushed abrasive particles) if desired.

Elongate shaped abrasive particles according to the present disclosure may be used in a loose form or slurry, and/or incorporated into abrasive products (e.g., bonded abrasives, coated abrasives, and nonwoven abrasives). Criteria used in selecting elongate shaped abrasive particles used for a particular abrading application typically include: abrading life, rate of cut, substrate surface finish, grinding efficiency, and product cost.

In one preferred embodiment, the dimensionally stable elongate precursor bodies are separated from the mold, optionally fractured and graded to a desired size distribution, and converted into ceramic elongate shaped ceramic bodies by calcining (an optional step), and sintering at elevated temperature. If not previously fractured, the ceramic elongate shaped ceramic bodies can be fractured and graded to a desired size distribution.

The dimensionally stable elongate precursor bodies can be removed from the grooves by gravity, vibration, ultrasonic vibration, vacuum, or pressurized air, for example. If desired, the dimensionally stable elongate precursor bodies can be further dried outside of the mold.

Optionally, but preferably, the dimensionally stable elongate precursor bodies are calcined at a temperature of from 500° C. to 800° C. for sufficient time (e.g., several hours) to remove bound water and increase durability in handling. This results in calcined elongate precursor bodies. Sintering may be accomplished in an oven or kiln as described in U.S. Pat. No. 8,142,531 (Adefris et al.), or by passage through a flame as described in PCT International Appln. Publ. No. WO 2014/165390 A1 (Erickson et al.).

In another preferred embodiment, the dimensionally stable elongate precursor bodies are left in the mold (which is made of combustible material), which is heated to burn off the mold and convert them into ceramic elongate shaped ceramic bodies by calcining (an optional step), and sintering at elevated temperature. The ceramic elongate shaped ceramic bodies are then fractured and graded to the desired size distribution.

Depending on the converting process, the molds may comprise various materials. If combustion is required, then the mold should be combustible, otherwise it may be made of noncombustible material (e.g., metal, ceramic, glass). Exemplary combustible materials include polymeric organic materials. Examples of suitable polymeric organic materials include thermoplastics such as polyesters, polycarbonates, poly(ether sulfone), poly(methyl methacrylate), polyurethanes, poly(vinyl chloride), polyolefins, polystyrene, polypropylene, polyethylene, combinations of the foregoing, and thermosetting materials.

The mold can have a generally planar bottom surface and a plurality of mold cavities, which may be in a production tool. The production tool can be a belt, a sheet, a continuous web, a coating roll (e.g., a rotogravure roll), a sleeve mounted on a coating roll, or die (e.g., a thread rolling die). The production tool may comprise a polymeric material. In one embodiment, the tooling is made from a polymeric or thermoplastic material. In another embodiment, the surfaces of the tooling in contact with the sol-gel while drying, such as the surfaces of the plurality of cavities, comprise a polymeric material while other portions of the tooling can be made from other materials. A suitable coating may be applied to a metal tooling to change its surface tension properties by way of example.

The mold can be made by replication from a master tool, for example, according to known methods. Preferably, the mold is obtained from a commercial source, which may be marketed for a completely unrelated application (e.g., architectural model siding).

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. Further detail concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Molds useful in practice of the present disclosure have open-ended grooves (including channels), typically extending between edges of the mold surface. The grooves may be straight curved, undulating or squiggly, or a combination thereof. In some preferred embodiments, the grooves are straight. The grooves may have any transverse cross-sectional profile. Examples include, rectangular, triangular, trapezoidal, rounded (e.g., semicircular), and combinations thereof. Importantly, the grooves are independent of one another. For example, the grooves are not fluidly connected to other grooves (e.g., as in a lattice groove structure).

Elongate shaped abrasive particles according to the present disclosure comprise an elongate shaped ceramic body having opposed first and second ends joined to each other by at least two longitudinal sidewalls. At least one of the at least two longitudinal sidewalls is concave along its length. At least one of the first and second ends, preferably both, is a fractured surface.

Figure 2:
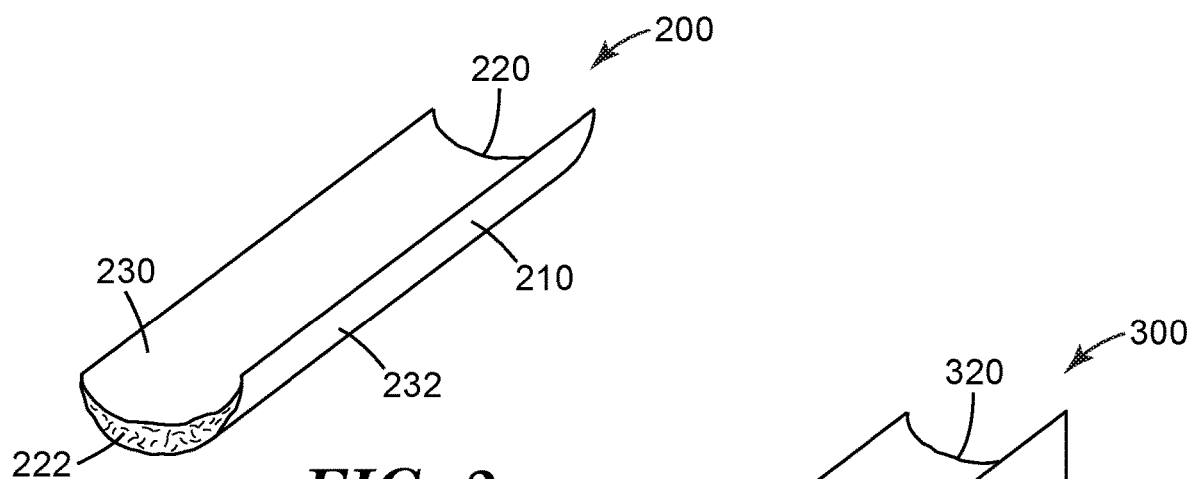
FIG. 2 is a schematic perspective view of an elongate shaped abrasive particle 200 according to the present disclosure.

Referring now to FIG. 2, exemplary elongate shaped abrasive particle 200 has an elongate shaped ceramic body 210 having opposed first and second ends 220, 222 joined to each other by longitudinal sidewalls 230, 232. Longitudinal sidewall 230 is concave along its length. First and second ends 220, 222 are fractured surfaces.

Figure 3:
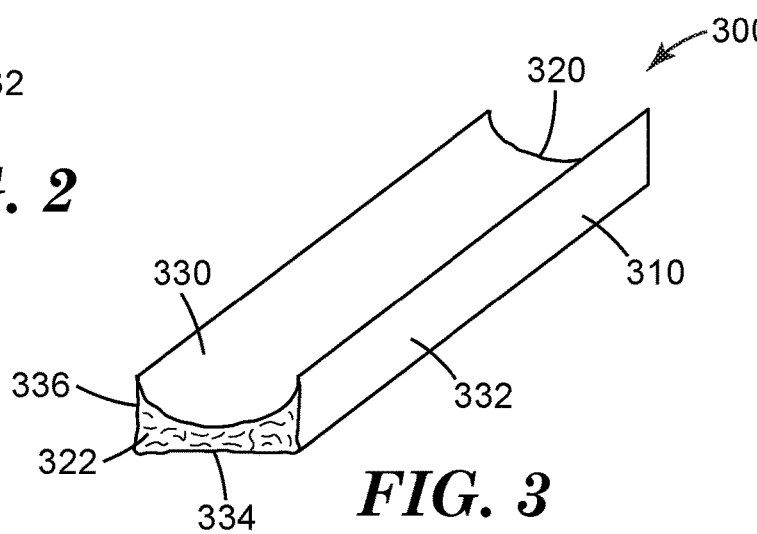
FIG. 3 is a schematic perspective view of an elongate shaped abrasive particle 300 according to the present disclosure.

Referring now to FIG. 3, exemplary elongate shaped abrasive particle 300 has an elongate shaped ceramic body 310 having opposed first and second ends 320, 322 joined to each other by longitudinal sidewalls 330, 332, 334, 336. Longitudinal sidewall 330 is concave along its length. First and second ends 320, 322 are fractured surfaces.

Elongate shaped abrasive particles according to the present disclosure have an aspect ratio of at least 2. In some embodiments, the elongate shaped abrasive particles have an aspect ratio of at least 4, at least 6, or even at least 10.

The present disclosure further provides a method of abrading a surface. The method comprises contacting an elongate shaped abrasive particle and/or abrasive article (e.g., a bonded abrasive wheel), according to the present disclosure, with a surface of a workpiece; and moving at least one of the elongate shaped abrasive particles or the contacted surface to abrade at least a portion of the surface with the elongate shaped abrasive particle and/or abrasive article. Methods for abrading with elongate shaped abrasive particles made according to the present disclosure range from snagging (i.e., high pressure high stock removal) to polishing (e.g., polishing medical implants with coated abrasive belts), wherein the latter is typically done with finer grades of elongate shaped abrasive particles. The elongate shaped abrasive particles may also be used in precision abrading applications, such as grinding cam shafts with vitrified bonded wheels. The size of the elongate shaped abrasive particles used for a particular abrading application will be apparent to those skilled in the art.

Abrading with elongate shaped abrasive particles according to the present disclosure may be done dry or wet. For wet abrading, the liquid may be introduced in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Elongate shaped abrasive particles made according to the present disclosure may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Bonded abrasive articles typically include a shaped mass of abrasive particles (e.g., elongate shaped abrasive particles according to the present disclosure) held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive articles typically comprise about 3-50 percent by volume of bond material, about 30-90 percent by volume of the elongate shaped abrasive particles (or a blend thereof of with crushed abrasive particles), up to 50 percent by volume additives (including grinding aids), and up to 70 percent by volume pores, based on the total volume of the bonded abrasive article.

Figure 4:
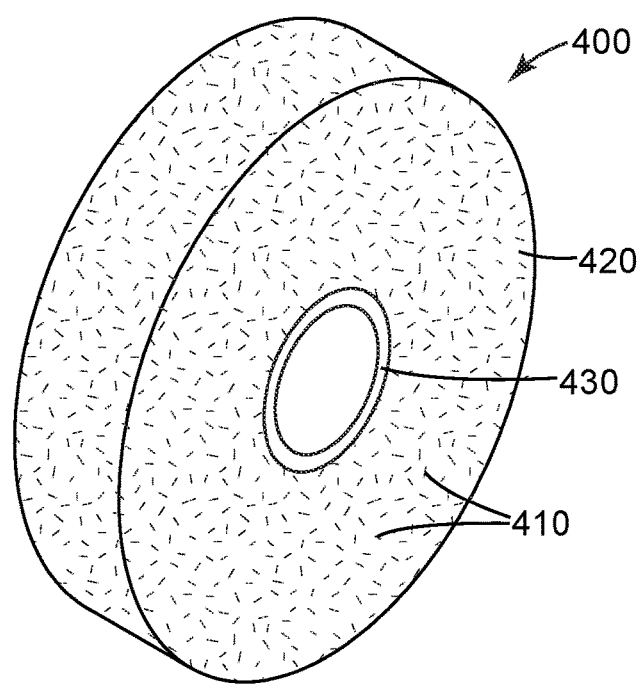
FIG. 4 is a schematic perspective view of a bonded abrasive wheel according to the present disclosure.

An exemplary grinding wheel is shown in FIG. 4. Referring now to FIG. 4, grinding wheel 400 is depicted, which includes elongate shaped abrasive particles made according to the present disclosure 410 in a binder material 420 (e.g., an organic binder or a vitreous binder), molded into a wheel and mounted on hub 430.

Suitable organic binders for making bonded abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the desired properties. The coupling agents can improve adhesion to the elongate shaped abrasive particles and/or filler. The binder chemistry may be thermally cured, radiation cured or combinations thereof. Additional details on binder chemistry may be found in U.S. Pat. No. 4,588,419 (Caul et al.); U.S. Pat. No. 4,751,138 (Tumey et al.), and U.S. Pat. No. 5,436,063 (Follett et al.).

Vitreous binders, which exhibit an amorphous structure and are typically hard, are well known in the art. In some cases, the vitreous binders include crystalline phases. Bonded, vitrified abrasive articles made according to the present disclosure may be in the shape of a wheel (including cut off wheels), honing stone, mounted pointed or other conventional bonded abrasive shape. In some embodiments, a vitrified bonded abrasive article made according to the present disclosure is in the form of a grinding wheel.

Vitreous binders can be made by heating various of metal oxides such as, for example, silica, silicates, alumina, soda, calcia, potassia, titania, iron oxide, zinc oxide, lithium oxide, magnesia, boria, aluminum silicate, borosilicate glass, lithium aluminum silicate, and combinations thereof. Typically, vitreous binders can be formed from compositions comprising from 10 to 100 percent of glass frit, although more typically the composition comprises 20 to 80 percent of glass frit, or 30 to 70 percent of glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the binder (also known as "bond") is matured depends, for example, on the particular bond chemistry.

In some embodiments, vitrified binders include those comprising silica, alumina (desirably, at least 10 percent by weight alumina), and boria (desirably, at least 10 percent by weight boria). In most cases, the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials.

Examples of useful fillers for the present disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g.; talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present disclosure to use a combination of different grinding aids, and in some instances this may produce a synergistic effect.

Bonded abrasive articles can contain 100 percent elongate shaped abrasive particles according to the present disclosure, or blends of such abrasive particles with other abrasive particles and/or diluent particles. However, at least about 2 percent by weight, desirably at least about 5 percent by weight, and more desirably about 30 to 100 percent by weight, of the abrasive particles in the abrasive articles should be elongate shaped abrasive particles made according to the present disclosure. In some instances, the elongate shaped abrasive particles made according to the present disclosure may be blended with other abrasive particles and/or diluent particles at a ratio between 5 to 75 percent by weight, about 25 to 75 percent by weight, about 40 to 60 percent by weight, or about 50 to 50 percent by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, abrasive agglomerates, and combinations thereof.

In some instances, a blend of abrasive particles may result in a bonded abrasive article that exhibits improved grinding performance in comparison with bonded abrasive articles comprising 100 percent of either type of abrasive particle. If there is a blend of abrasive particles, the abrasive particle types forming the blend may be of the same size. Alternatively, the abrasive particle types may be of different particle sizes.

Examples of suitable diluent particles include marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example, in a bonded abrasive, there may be two distinct sections of the grinding wheel. The outermost section may comprise abrasive particles made according to the present disclosure, whereas the innermost section does not. Alternatively, elongate shaped abrasive particles made according to the present disclosure may be uniformly distributed throughout the bonded abrasive article. Further details regarding resin bonded abrasive articles can be found, for example, in U.S. Pat. No. 4,543,107 (Rue); U.S. Pat. No. 4,741,743 (Narayanan et al.); U.S. Pat. No. 4,800,685 (Haynes et al.); U.S. Pat. No. 4,898,597 (Hay et al.); U.S. Pat. No. 4,997,461 (Markhoff-Matheny et al.); U.S. Pat. No. 5,037,453 (Narayanan et al.); U.S. Pat. No. 5,110,332 (Narayanan et al.); and U.S. Pat. No. 5,863,308 (Qi et al.). Further details regarding vitreous bonded abrasives can be found, for example, in U.S. Pat. No. 4,543,107 (Rue); U.S. Pat. No. 4,898,597 (Hay et al.); U.S. Pat. No. 4,997,461 (Markhoff-Matheny et al.); U.S. Pat. No. 5,094,672 (Giles Jr. et al.); U.S. Pat. No. 5,118,326 (Sheldon et al.); U.S. Pat. No. 5,131,926 (Sheldon et al.); U.S. Pat. No. 5,203,886 (Sheldon et al.); U.S. Pat. No. 5,282,875 (Wood et al.); U.S. Pat. No. 5,738,696 (Wu et al.), and U.S. Pat. No. 5,863,308 (Qi).

Select Embodiments of the Present Disclosure

In a first embodiment, the present disclosure provides an elongate shaped abrasive particle comprising an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface.

In a second embodiment, the present disclosure provides an elongate shaped abrasive particle according to the first embodiment, wherein said at least two longitudinal sidewalls consist of two longitudinal sidewalls, and wherein the elongate shaped ceramic body has a continuous crescent-shaped cross-sectional shape.

In a third embodiment, the present disclosure provides an elongate shaped abrasive particle according to the first embodiment, wherein said at least two longitudinal sidewalls comprise four longitudinal sidewalls, two of which are parallel.

In a fourth embodiment, the present disclosure provides an elongate shaped abrasive particle according to any of the first to third embodiments, wherein the elongate shaped ceramic body has an aspect ratio of at least two.

In a fifth embodiment, the present disclosure provides an elongate shaped abrasive particle according to any of the first to fourth embodiments, wherein the elongate shaped ceramic body has an aspect ratio of at least ten.

In a sixth embodiment, the present disclosure provides an elongate shaped abrasive particle according to any of the first to fifth embodiments, wherein the elongate shaped ceramic body comprises alpha alumina.

In a seventh embodiment, the present disclosure provides a plurality of abrasive particles, wherein at least half of the plurality of abrasive particles comprise elongate shaped abrasive particles according to any of the first to sixth embodiments.

In an eighth embodiment, the present disclosure provides a bonded abrasive article comprising a plurality of abrasive particles according to the seventh embodiment bonded together by a binder material.

In a ninth embodiment, wherein the binder material comprises a vitreous binder material.

In a tenth embodiment, the present disclosure provides a bonded abrasive article according to the eighth embodiment, wherein the binder material comprises an organic binder material.

In an eleventh embodiment, the present disclosure provides a bonded abrasive article according to any of the eighth to tenth embodiments, wherein the bonded abrasive article comprises a bonded abrasive wheel.

In a twelfth embodiment, the present disclosure provides a method of making a plurality of elongate shaped abrasive particles, the method comprising sequential steps:

a) providing a mold having a plurality of isolated open-ended grooves disposed on a major surface thereof;

b) filling at least a portion of the plurality of isolated open-ended grooves with a molding composition comprising a ceramic precursor material and a volatile liquid;

c) removing any excess molding composition not disposed within the plurality of isolated open-ended grooves, if present, from the mold;

d) removing a sufficient amount of the liquid vehicle to provide a plurality of dimensionally stable elongate precursor bodies; and e) converting at least a portion of the plurality of dimensionally stable elongate precursor bodies into the elongate shaped abrasive particles, each comprising, respectively, an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface.

In a thirteenth embodiment, the present disclosure provides a method according to the twelfth embodiment, wherein step e) comprises separating the plurality of dimensionally stable elongate precursor bodies from the mold, fracturing the plurality of dimensionally stable elongate precursor bodies, and heating the fractured plurality of dimensionally stable elongate precursor bodies to convert them into the elongate shaped abrasive particles.

In a fourteenth embodiment, the present disclosure provides a method according to the twelfth embodiment, wherein step e) comprises separating the plurality of dimensionally stable elongate precursor bodies from the mold, heating the plurality of dimensionally stable elongate precursor bodies to convert them into elongate ceramic bodies, and fracturing the elongate ceramic bodies to convert them into the elongate shaped abrasive particles.

In a fifteenth embodiment, the present disclosure provides a method according to any one of the twelfth to fourteenth embodiments, wherein the molding composition comprises a sol-gel material.

In a sixteenth embodiment, the present disclosure provides a method according to the fifteenth embodiment, wherein the molding composition comprises a sol-gel alpha alumina precursor.

In a seventeenth embodiment, the present disclosure provides a method according to any one of the twelfth to sixteenth embodiments, wherein the molding composition comprises alpha alumina particles.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Unless stated otherwise, all other reagents were obtained, or are available from fine chemical vendors such as Sigma-Aldrich Company, St. Louis, Mo., or may be synthesized by known methods.

Example 1

A sample of boehmite sol-gel was made using the following recipe: 1600 parts of DISPERAL aluminum oxide monohydrate powder (Sasol North America Inc., Houston, Tex.) was dispersed by high shear mixing a solution containing 2400 parts of deionized water and 72 parts of 70% aqueous nitric acid. The resulting sol-gel was aged for 1 hour. The resulting sol-gel was forced into a grooved styrene sheet (obtained as #4530 0.125 INCH OPAQUE WHITE STYRENE SHEET from Evergreen Scale Models Company, Des Plaines, Ill.) having a topical coating of peanut oil obtained by brushing about 2 grams of a 1 percent by weight peanut oil solution in methanol onto the 12 inches (30.5 cm)×6 inches (15.2 cm) sheet. The sol-gel was spread to the sheet using a putty knife so that the grooves were completely filled. The sheet containing the sol-gel was then air dried for two hours. Following drying, the sheet was shaken to dislodge the resulting precursor shaped particles. The precursor particles now consisted of various lengths with shaped cross section according to the grooves on sheet.

The precursor shaped abrasive particles were calcined by heating them to approximately 650 degrees Celsius (° C.) in air for 15 minutes, then saturated with a mixed nitrate solution of the following concentrations (reported as oxides): 1.8 percent each of MgO, $Y_2O_3$, $Nd_2O_3$ and $La_2O_3$. The excess nitrate solution was removed, and the saturated precursor shaped abrasive particles were allowed to dry after which the particles were again calcined at 650° C., and then sintered at approximately 1400° C. Both the calcining and sintering was performed using rotary tube kilns. Elongate shaped abrasive particles produced by the above method are shown in FIG. 5.

Performance Test of Example 1 and Comparative A

Elongate shaped abrasive particles made in Example 1 were manually broken using a razor blade to produce particles of lengths of no more than approximately 3 millimeters. The abrasive particles were sieved through a set of USA Standard Testing Sieves with sizes 25, 30, 35, and 40. Approximately 85% of the abrasive particles were retained on the 30 and 35 mesh screens. The fraction retained on the 30 mesh screen was collected and used to make a coated abrasive disc. The coated abrasive disc was made according to conventional procedures. Twelve grams of the shaped abrasive particles were bonded to 17.8 cm diameter, 0.8 mm thick vulcanized fiber backings (having a 2.2 cm diameter center hole) using a conventional calcium carbonate-filled phenolic make resin (48 weight percent of resole phenolic resin, 52 weight percent of calcium carbonate, diluted to 81 weight percent solids with water and glycol ether) and a conventional cryolite-filled phenolic size resin (32 weight percent of resole phenolic resin, 2 weight percent of iron oxide, 66 weight percent of cryolite, diluted to 78 weight percent of solids with water and glycol ether). The wet make resin weight was about 185 grams per square meter Immediately after the make coat was applied, the shaped abrasive particles were electrostatically coated. The make resin was heated for 120 minutes at 88° C. Then, the cryolite-filled phenolic size coat was coated over the make coat and abrasive particles. The wet size weight was about 850 grams per square meter. The size resin was heated for 12 hours at 99° C. The coated abrasive disc was flexed prior to testing.

Comparative Example A coated abrasive discs were prepared as described above, except that conventional crushed sol-gel-derived alumina abrasive particles (3M CERAMIC ABRASIVE GRAIN 321, 3M Company, St. Paul, Minn.) were used in place of the elongate shaped abrasive particles made in Example 1.

The performance of coated abrasive discs using the Example 1 and Comparative Example A abrasive particles was evaluated as follows. Each coated abrasive disc for evaluation was attached to a rotary grinder fitted with a 7-inch (17.8 centimeters) ribbed disc pad face plate (80514 EXTRA HARD RED, 3M Company). The grinder was then activated and urged against an end face of a 0.75 inch (1.9 cm)×0.75 inch (1.9 cm) pre-weighed 1045 steel bar under a load of 10 pounds (4.5 kg). The resulting rotational speed of the grinder under this load and against this workpiece was 5000 revolutions per minute. The workpiece was abraded under these conditions for a total of fifty 20-second grinding intervals (passes). Following each 20-second interval, the workpiece was allowed to cool to room temperature and weighed to determine the cut of the abrasive operation. Test results were reported as the incremental cut for each interval and the total cut removed. The total cut was the sum of the amount of material removed from the workpiece throughout the test period. The test results are reported in Table I, below.

TABLE I

| GRINDING | 1045 STEEL CUMULATIVE CUT, grams | |
|---|---|---|
| PASSES | EXAMPLE 1 | COMPARATIVE EXAMPLE A |
| 10 | 195 | 201 |
| 20 | 346 | 362 |
| 30 | 510 | 490 |
| 40 | 671 | 581 |
| 50 | 808 | 660 |

Example 2

A sample of alumina slurry was prepared using the following recipe: 7851 part of alumina powder (RG 4000, Almatis, Theemsweg, Netherlands) was dispersed by mixing 1963 parts of deionized water and 17 parts of anhydrous citric acid. The resulting mixture was milled at 1700 revolutions per minute for 0.5 hours to produce a smooth and creamy slurry. After completion of the milling, 169 parts of a binder solution consisting of 6.67 weight percent of magnesium citrate, 16.97 weight percent of cellulose gum (BLANOSE from Hercules, Inc., Wilmington, Del.), and 76.36 weight percent of deionized water was were thoroughly stirred into the mixture. The resulting alumina slurry was forced into a grooved polypropylene microreplicated tooling. A scanning electron microscope (SEM) micrograph (JEOL MODEL 7600F scanning electron microscope, JEOL, Tokyo, Japan) of the surface of the tooling is shown in FIG. 6A and an SEM micrograph of the side view of the tooling is shown in FIG. 6B. The microreplicated tooling contained a series of grooves with curved sidewalls that intersected to form a line at the base of the groove. The width of the grooves varied from approximately 0.5 millimeters to over 1 millimeter, and the depths were all 0.5 millimeters.

Before the slurry was applied to the microreplicated tooling, the tooling was topically coated with peanut oil (approximately 1.55 gram per square meter) onto the surface of the polypropylene tooling. The slurry was spread to the tooling using a squeegee so that the grooves were completely filled. The tooling containing the slurry was then allowed to dry in a forced air oven at approximately 82.2° C. Following drying, the tooling was allowed to dislodge the resulting precursor shaped particles, which were shaped according to the grooves in cross-section. The precursor particles were crushed to produce particles of lengths of no more than approximately 6.4 millimeters. The precursor abrasive particles were fired to 1515° C. for 3 hours to form elongate shaped abrasive particles. SEM micrographs of the resulting elongate shaped abrasive particles are shown in FIGS. 7A and 7B.

The densities of the resultant sintered shaped abrasive particles were measured with the use of an ACCUPYC II 1330 pycnometer from Micromeritics Instrument Corporation, Norcross, Ga., according to standard operating procedure. The true density of the sintered shaped abrasive particles prepared from the above method was measured at approximately 3.85 grams per cubic centimeter.

Performance Test of Example 2 and Comparatives B, C

The abrasive particles made form Example 2 were graded through USA Standard Testing Sieves and the abrasive particles obtained from −30+35 mesh sieves were used to make depressed center grinding wheels. A Type 27 depressed-center composite grinding wheel was prepared as follows. A mix was prepared by combining 860 grams abrasive particles obtained from the above procedure, 55 grams liquid phenolic resin (obtained under trade designation "PREFERE 825136G1" from Dynea Oy Corporation, Helsinki, Finland), 155 grams phenolic resin powder (obtained under trade designation "VARCUM 29302" from Durez Corporation, Niagara Falls, N.Y.) and 155 grams sodium hexafluoroaluminate (obtained under trade designation "CRYOLITE" from Freebee, Ullerslev, Denmark) and mixed for 10 minutes using a paddle-type mixer (CUISINART SM-70 from Conair Corporation, East Windsor, N.J., operated at speed 1). A 4.5-inch (11.4 centimeters) diameter disc of fiberglass mesh scrim (obtained under the trade designation "PS 660" from Swatycomet, Maribor, Slovenia) was placed into a 4.5-inch (11.4 centimeters) diameter cavity die. The mix (75 grams) was spread out evenly. A second 4-inch (10.2 centimeters) diameter of fiberglass mesh scrim (PS 660, from Swatycomet) was placed on top of the mixture. Then additional mix (75 grams) was spread out evenly. A third 3-inch (7.4 centimeters) diameter of fiberglass mesh scrim (PS 660 from Swatycomet) was placed on top. The filled cavity mold was then pressed at a pressure of 40 tons/38 square inches (14.5 MPa). The resulting wheel was removed from the cavity mold and placed on a spindle between depressed center aluminum plates in order to be pressed into a Type 27 depressed-center grinding wheel. The wheel was compressed at 5 ton/38 square inches (1.8 MPa) to shape the disc. The wheel was then placed in an oven to cure for 7 hours at 79° C., 3 hours at 107° C., 18 hours at 185° C., and a temperature ramp-down over 4 hours to 27° C. The dimensions of the final grinding wheel were 180 mm diameter×7 mm thickness. The center hole was ⅞ inch (2.2 cm) in diameter.

Comparative Examples B was a 4½ inch (11.4 cm) BLUEFIRE DEPRESSED CENTER WHEEL (Type 27) from Saint-Gobain S.A., Courbevoie, France.

Comparative Example C was obtained as a GREEN CORPS CUTTING/GRINDING WHEEL—4½ INCH (11.4 cm) (Type 27) from 3M Company.

Abrasive wheels were tested by grinding a rectangular mild steel bar (0.25 inch (0.6 cm)×18 inches (45.7 cm)×3 inches (7.6 cm)) over a 0.25 inch (0.6 cm)×18 inches (45.7 cm) area of the surface while mounted on an air driven grinder (operated at 12000 revolutions per minute) that oscillated back and forth for ten one-minute cycles. Each cycle is for a total of 36 inches (91.4 cm) with 18 inches (45.7 cm) each way. The applied load was the grinder weight of 9 pounds (4.1 kilograms) and the abrasive wheel was held at an angle of 15 degrees relative to the surface. The steel bar was weighed before and after each cycle, and the total cut (the total weight loss of the steel bar) was recorded after the 10-cycle test. Test results are reported in TABLE 2, below.

TABLE 2

|  | Total Cut, grams |
| --- | --- |
| Example 2 | 254 |
| Comparative Example B | 219 |
| Comparative Example C | 144 |

Various modifications and alterations of this disclosure may be made by those skilled in the art without departing from the scope and spirit of this disclosure, and it should be understood that this disclosure is not to be unduly limited to the illustrative embodiments set forth herein.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An elongate shaped abrasive particle comprising an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface, wherein said at least two longitudinal sidewalls consist of two longitudinal sidewalls, and wherein the elongate shaped ceramic body has a continuous crescent-shaped cross-sectional shape.

2. An elongate shaped abrasive particle comprising an elongate shaped ceramic body having opposed first and second ends joined to each other by at least two longitudinal sidewalls, wherein at least one of the at least two longitudinal sidewalls is concave along its length, and wherein at least one of the first and second ends is a fractured surface, and wherein said at least two longitudinal sidewalls comprise four longitudinal sidewalls, two of which are parallel.

3. The elongate shaped abrasive particle of claim 1, wherein the elongate shaped ceramic body has an aspect ratio of at least two.

4. The elongate shaped abrasive particle of claim 1, wherein the elongate shaped ceramic body has an aspect ratio of at least ten.

5. The elongate shaped abrasive particle of claim 1, wherein the elongate shaped ceramic body comprises alpha alumina.

6. A plurality of abrasive particles, wherein at least half of the plurality of abrasive particles comprises elongate shaped abrasive particles according to claim 1.

* * * * *